(12) United States Patent
Gara et al.

(10) Patent No.: US 8,010,875 B2
(45) Date of Patent: Aug. 30, 2011

(54) ERROR CORRECTING CODE WITH CHIP KILL CAPABILITY AND POWER SAVING ENHANCEMENT

(75) Inventors: Alan G. Gara, Mount Kisco, NY (US); Dong Chen, Croton On Husdon, NY (US); Paul W. Coteus, Yorktown Heights, NY (US); William T. Flynn, Rochester, MN (US); James A. Marcella, Rochester, MN (US); Todd Takken, Brewster, NY (US); Barry M. Trager, Yorktown Heights, NY (US); Shmuel Winograd, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 1098 days.

(21) Appl. No.: 11/768,559

(22) Filed: Jun. 26, 2007

(65) Prior Publication Data

US 2009/0006899 A1    Jan. 1, 2009

(51) Int. Cl.
*G06F 11/10* (2006.01)
(52) U.S. Cl. ..................................... 714/773
(58) Field of Classification Search .................. 714/773
See application file for complete search history.

(56) References Cited

U.S. PATENT DOCUMENTS

| | | | |
|---|---|---|---|
| 4,464,753 A * | 8/1984 | Chen | 714/765 |
| 4,777,595 A | 10/1988 | Strecker et al. | |
| 4,961,193 A * | 10/1990 | Debord et al. | 714/753 |
| 5,063,562 A | 11/1991 | Barzilai et al. | |
| 5,077,737 A * | 12/1991 | Leger et al. | 714/6 |
| 5,142,422 A | 8/1992 | Zook et al. | |
| 5,349,587 A | 9/1994 | Nadeau-Dostie et al. | |
| 5,353,412 A | 10/1994 | Douglas et al. | |
| 5,452,432 A | 9/1995 | Macachor | |
| 5,459,742 A * | 10/1995 | Cassidy et al. | 714/769 |
| 5,524,220 A | 6/1996 | Verma et al. | |
| 5,634,007 A | 5/1997 | Calta et al. | |
| 5,659,710 A | 8/1997 | Sherman et al. | |
| 5,708,779 A | 1/1998 | Graziano et al. | |
| 5,761,464 A | 6/1998 | Hopkins | |
| 5,796,735 A | 8/1998 | Miller et al. | |

(Continued)

OTHER PUBLICATIONS

Definition of "mechanism", Oxford English Dictionary, http://dictionary.oed.com/cgi/entry/00304337?query_type=word&queryword=mechanism&first=1&max_to_show=10&sort_type=alpha&result_place=2&search_id=y2 atElGc-11603&hilite+00304337.

(Continued)

*Primary Examiner* — Stephen M Baker
(74) *Attorney, Agent, or Firm* — Scully, Scott, Murphy & Presser, P.C.; Daniel P. Morris, Esq.

(57) ABSTRACT

A method and system are disclosed for detecting memory chip failure in a computer memory system. The method comprises the steps of accessing user data from a set of user data chips, and testing the user data for errors using data from a set of system data chips. This testing is done by generating a sequence of check symbols from the user data, grouping the user data into a sequence of data symbols, and computing a specified sequence of syndromes. If all the syndromes are zero, the user data has no errors. If one of the syndromes is non-zero, then a set of discriminator expressions are computed, and used to determine whether a single or double symbol error has occurred. In the preferred embodiment, less than two full system data chips are used for testing and correcting the user data.

35 Claims, 4 Drawing Sheets

U.S. PATENT DOCUMENTS

| | | | |
|---|---|---|---|
| 5,809,278 | A | 9/1998 | Watanabe et al. |
| 5,825,748 | A | 10/1998 | Barleu et al. |
| 5,890,211 | A | 3/1999 | Sokolov et al. |
| 5,917,828 | A | 6/1999 | Thompson |
| 6,023,732 | A | 2/2000 | Moh et al. |
| 6,061,511 | A | 5/2000 | Marantz et al. |
| 6,072,781 | A | 6/2000 | Feeney et al. |
| 6,122,715 | A | 9/2000 | Palanca et al. |
| 6,185,214 | B1 | 2/2001 | Schwartz et al. |
| 6,219,300 | B1 | 4/2001 | Tamaki |
| 6,263,397 | B1 | 7/2001 | Wu et al. |
| 6,295,571 | B1 | 9/2001 | Scardamalia et al. |
| 6,311,249 | B1 | 10/2001 | Min et al. |
| 6,324,495 | B1 | 11/2001 | Steinman |
| 6,356,106 | B1 | 3/2002 | Greeff et al. |
| 6,366,984 | B1 | 4/2002 | Carmean et al. |
| 6,442,162 | B1 | 8/2002 | O'Neill et al. |
| 6,466,227 | B1 | 10/2002 | Pfister et al. |
| 6,564,331 | B1 | 5/2003 | Joshi |
| 6,594,234 | B1 | 7/2003 | Chard et al. |
| 6,598,123 | B1 | 7/2003 | Anderson et al. |
| 6,601,144 | B1 | 7/2003 | Arimilli et al. |
| 6,631,447 | B1 | 10/2003 | Morioka et al. |
| 6,647,428 | B1 | 11/2003 | Bannai et al. |
| 6,662,305 | B1 | 12/2003 | Salmon et al. |
| 6,735,174 | B1 | 5/2004 | Hefty et al. |
| 6,775,693 | B1 | 8/2004 | Adams |
| 6,799,232 | B1 | 9/2004 | Wang |
| 6,880,028 | B2 | 4/2005 | Kurth |
| 6,889,266 | B1 | 5/2005 | Stadler |
| 6,894,978 | B1 | 5/2005 | Hashimoto |
| 6,954,887 | B2 | 10/2005 | Wang et al. |
| 6,986,026 | B2 | 1/2006 | Roth et al. |
| 7,007,123 | B2 | 2/2006 | Golla et al. |
| 7,058,826 | B2 | 6/2006 | Fung |
| 7,065,594 | B2 | 6/2006 | Ripy et al. |
| 7,143,219 | B1 | 11/2006 | Chaudhari et al. |
| 7,191,373 | B2 | 3/2007 | Wang et al. |
| 7,239,565 | B2 | 7/2007 | Liu |
| 7,280,477 | B2 | 10/2007 | Jeffries et al. |
| 7,298,746 | B1 | 11/2007 | De La Iglesia et al. |
| 7,363,629 | B2 | 4/2008 | Springer et al. |
| 7,373,420 | B1 | 5/2008 | Lyon |
| 7,401,245 | B2 | 7/2008 | Fischer et al. |
| 7,454,640 | B1 | 11/2008 | Wong |
| 7,454,641 | B2 | 11/2008 | Connor et al. |
| 7,461,236 | B1 | 12/2008 | Wentzlaff |
| 7,463,529 | B2 | 12/2008 | Matsubara |
| 7,539,845 | B1 | 5/2009 | Wentzlaff et al. |
| 7,613,971 | B2 | 11/2009 | Asaka |
| 7,620,791 | B1 | 11/2009 | Wentzlaff et al. |
| 7,698,581 | B2 | 4/2010 | Oh |
| 2001/0055323 | A1 | 12/2001 | Rowett et al. |
| 2002/0078420 | A1 | 6/2002 | Roth et al. |
| 2002/0087801 | A1 | 7/2002 | Bogin et al. |
| 2002/0100020 | A1 | 7/2002 | Hunter et al. |
| 2002/0129086 | A1 | 9/2002 | Garcia-Luna-Aceves et al. |
| 2002/0138801 | A1 | 9/2002 | Wang et al. |
| 2002/0156979 | A1 | 10/2002 | Rodriguez |
| 2002/0184159 | A1 | 12/2002 | Tadayon et al. |
| 2003/0007457 | A1 | 1/2003 | Farrell et al. |
| 2003/0028749 | A1 | 2/2003 | Ishikawa et al. |
| 2003/0050714 | A1 | 3/2003 | Tymchenko |
| 2003/0050954 | A1 | 3/2003 | Tayyar et al. |
| 2003/0074616 | A1 | 4/2003 | Dorsey |
| 2003/0105799 | A1 | 6/2003 | Khan et al. |
| 2003/0163649 | A1 | 8/2003 | Kapur et al. |
| 2003/0177335 | A1 | 9/2003 | Luick |
| 2003/0188053 | A1 | 10/2003 | Tsai |
| 2003/0235202 | A1 | 12/2003 | Van Der Zee et al. |
| 2004/0003184 | A1 | 1/2004 | Safranek et al. |
| 2004/0019730 | A1 | 1/2004 | Walker et al. |
| 2004/0024925 | A1 | 2/2004 | Cypher et al. |
| 2004/0073780 | A1 | 4/2004 | Roth et al. |
| 2004/0103218 | A1 | 5/2004 | Blumrich et al. |
| 2004/0210694 | A1 | 10/2004 | Shenderovich |
| 2004/0243739 | A1 | 12/2004 | Spencer |
| 2005/0007986 | A1 | 1/2005 | Malladi et al. |
| 2005/0053057 | A1 | 3/2005 | Deneroff et al. |
| 2005/0076163 | A1 | 4/2005 | Malalur |
| 2005/0160238 | A1 | 7/2005 | Steely et al. |
| 2005/0216613 | A1 | 9/2005 | Ganapathy et al. |
| 2005/0251613 | A1 | 11/2005 | Kissell |
| 2005/0270886 | A1 | 12/2005 | Takashima |
| 2005/0273564 | A1 | 12/2005 | Lakshmanamurthy et al. |
| 2006/0050737 | A1 | 3/2006 | Hsu |
| 2006/0080513 | A1 | 4/2006 | Beukema et al. |
| 2006/0206635 | A1 | 9/2006 | Alexander et al. |
| 2006/0248367 | A1 | 11/2006 | Fischer et al. |
| 2007/0055832 | A1 | 3/2007 | Beat |
| 2007/0133536 | A1 | 6/2007 | Kim et al. |
| 2007/0168803 | A1 | 7/2007 | Wang et al. |
| 2007/0174529 | A1 | 7/2007 | Rodriguez et al. |
| 2007/0195774 | A1 | 8/2007 | Sherman et al. |
| 2008/0147987 | A1 | 6/2008 | Cantin et al. |

OTHER PUBLICATIONS

Almasi, et al., "MPI on BlueGene/L: Designing an Efficient General Purpose Messaging Solution for a Large Cellular System," IBM Research Report RC22851 (W037-150) Jul. 22, 2003.

Almasi, et al.,"Optimization of MPI Collective Communication on BlueGene/L Systems," ICS'05, Jun. 20-22, 2005, Boston, MA.

Gara, et al., "Overview of the Blue Gene/L system architecture," IBM J. Res. & Dev., vol. 49, No. 2/3, Mar./May 2005, pp. 195-212.

Huang, et al., "Performance Evaluation of Adaptive MPI," PPoPP'06, Mar. 29-31, 2006, New York, New York.

MPI (Message Passing Interface) standards documents, errata, and archives http://www.mpi-forum.org visited Jun. 16, 2007 (Sections 4.2, 4.4 and 10.4).

David Chaiken, Craig Fields, Kiyoshi Kurihara, Anant Agarwal, Directory-Based Cache Coherence in Large-Scale Multiprocessors, Computer, v.23 n. 6, p. 49-58, Jun. 1990.

Michel, Dubois, Christoph Scheurich, Faye A. Briggs, Synchronization, Coherence, and Event Ordering in Multiprocessors, Computer, v.21 n. 2, p. 9-21, Feb. 1988.

Giampapa, et al., "Blue Gene/L advanced diagnostics environment," IBM J. Res. & Dev., vol. 49, No. 2/3, Mar./May 2005, pp. 319-331.

IBM Journal of Research and Development, Special Double Issue on Blue Gene, vol. 49, Nos. 2/3, Mar./May 2005 ("Preface").

IBM Journal of Research and Development, Special Double Issue on Blue Gene, vol. 49, Nos. 2/3, Mar./May 2005 ("Intro").

"Intel 870: A Building Block for Cost-Effective, Scalable Servers", Faye Briggs, Michel et al., pp. 36-47, Mar.-Apr. 2002.

Pande, et al., Performance Evaluation and Design Trade-Offs for Network-On-Chip Interconnect Architectures, 2005, IEEE, pp. 1025-1040.

* cited by examiner

ERROR CORRECTING CODE WITH CHIP KILL CAPABILITY AND POWER SAVING ENHANCEMENT

GOVERNMENT RIGHTS

This invention was made with Government support under Contract No.: B554331, awarded by Department of Energy. The Government has certain rights to this invention.

CROSS-REFERENCE TO RELATED APPLICATIONS

The present invention is related to the following commonly-owned, co-pending U.S. patent applications filed on even date herewith, the entire contents and disclosure of each of which is expressly incorporated by reference herein as if fully set forth herein. U.S. patent application Ser. No. (YOR920070268US1 (21189)), for "A SHARED PERFORMANCE MONITOR IN A MULTIPROCESSOR SYSTEM"; U.S. patent application Ser. No. (YOR920070293US1 (21233)), for "OPTIMIZED COLLECTIVES USING A DMA ON A PARALLEL COMPUTER"; U.S. patent application Ser. No. (YOR920070295US1 (21232)), for "DMA SHARED BYTE COUNTERS IN A PARALLEL COMPUTER"; U.S. patent application Ser. No. (YOR920070297US1 (21208)), for "MULTIPLE NODE REMOTE MESSAGING"; U.S. patent application Ser. No. (YOR920070298US1 (21209)), for "A METHOD AND APPARATUS OF PREFETCHING STREAMS OF VARYING PREFETCH DEPTH"; U.S. patent application Ser. No. (YOR920070299US1 (21212)), for "PROGRAMMABLE PARTITIONING FOR HIGH-PERFORMANCE COHERENCE DOMAINS IN A MULTIPROCESSOR SYSTEM"; U.S. patent application Ser. No. (YOR920070300US1 (21211)), for "METHOD AND APPARATUS FOR SINGLE-STEPPING COHERENCE EVENTS IN A MULTIPROCESSOR SYSTEM UNDER SOFTWARE CONTROL"; U.S. patent application Ser. No. (YOR920070301US1 (21210)), for "INSERTION OF COHERENCE EVENTS INTO A MULTIPROCESSOR COHERENCE PROTOCOL"; U.S. patent application Ser. No. (YOR920070302US1 (21216), for "METHOD AND APPARATUS TO DEBUG AN INTEGRATED CIRCUIT CHIP VIA SYNCHRONOUS CLOCK STOP AND SCAN"; U.S. patent application Ser. No. (YOR920070303US1 (21236)), for "DMA ENGINE FOR REPEATING COMMUNICATION PATTERNS"; U.S. patent application Ser. No. (YOR920070304US1 (21239)), for "METHOD AND APPARATUS FOR A CHOOSE-TWO MULTI-QUEUE ARBITER"; U.S. patent application Ser. No. (YOR920070305US1 (21238)), for "METHOD AND APPARATUS FOR EFFICIENTLY TRACKING QUEUE ENTRIES RELATIVE TO A TIMESTAMP"; U.S. patent application Ser. No. (YOR920070307US1 (21245)), for "BAD DATA PACKET CAPTURE DEVICE"; U.S. patent application Ser. No. (YOR920070321US1 (21256)), for "EXTENDED WRITE COMBINING USING A WRITE CONTINUATION HINT FLAG"; U.S. patent application Ser. No. (YOR920070322US1 (21255)), for "A SYSTEM AND METHOD FOR PROGRAMMABLE BANK SELECTION FOR BANKED MEMORY SUBSYSTEMS"; U.S. patent application Ser. No. (YOR920070323US1 (21246)), for "AN ULTRASCALABLE PETAFLOP PARALLEL SUPERCOMPUTER"; U.S. patent application Ser. No. (YOR920070324US1 (21264)), for "SDRAM DDR DATA EYE MONITOR METHOD AND APPARATUS"; U.S. patent application Ser. No. (YOR920070337US1 (21281)), for "A CONFIGURABLE MEMORY SYSTEM AND METHOD FOR PROVIDING ATOMIC COUNTING OPERATIONS IN A MEMORY DEVICE"; U.S. patent application Ser. No. (YOR920070339US1 (21292)), for "STATIC POWER REDUCTION FOR MIDPOINT-TERMINATED BUSSES"; U.S. patent application Ser. No. (YOR920070340US1 (21295)), for "COMBINED GROUP ECC PROTECTION AND SUBGROUP PARITY PROTECTION"; U.S. patent application Ser. No. (YOR920070355US1 (21299)), for "A MECHANISM TO SUPPORT GENERIC COLLECTIVE COMMUNICATION ACROSS A VARIETY OF PROGRAMMING MODELS"; U.S. patent application Ser. No. (YOR920070356US1 (21263)), for "MESSAGE PASSING WITH A LIMITED NUMBER OF DMA BYTE COUNTERS"; U.S. patent application Ser. No. (YOR920070357US1 (21312)), for "ASYNCRONOUS BROADCAST FOR ORDERED DELIVERY BETWEEN COMPUTE NODES IN A PARALLEL COMPUTING SYSTEM WHERE PACKET HEADER SPACE IS LIMITED"; U.S. patent application Ser. No. (YOR920070361US1 (21215)), for "HARDWARE PACKET PACING USING A DMA IN A PARALLEL COMPUTER"; and U.S. patent application Ser. No. (YOR920070371US1 (21335)), for "POWER THROTTLING OF COLLECTIONS OF COMPUTING ELEMENTS".

BACKGROUND OF THE INVENTION

1. Field of the Invention

This invention generally relates to computer systems, and more specifically, to detecting and correcting errors in data transmitted from a memory of a computer system.

2. Background Art

The small size of computer transistors and capacitors, combined with transient electrical and electromagnetic phenomena, cause occasional errors in stored information in computer memory systems. Therefore, even well designed and generally reliable memory systems are susceptible to memory device failures.

In an effort to minimize the effects of these memory device failures, various error-checking schemes have been developed to detect, and in some cases correct, errors in messages read from memory. The simplest error detection scheme is the parity bit. A parity bit is an extra bit included with a binary data message or data word to make the total number of 1's in the message either odd or even. For "even parity" systems, the parity bit is set to make the total number of 1's in the message even. For "odd parity" systems, the parity bit is set to make the total number of 1's in the message odd. For example, in a system utilizing odd parity, a message having two 1's would have its parity bit set to 1, thereby making the total number of 1's odd. Then, the message including the parity bit is transmitted and subsequently checked at the receiving end for errors. An error results if the parity of the data bits in the message does not correspond to the parity bit transmitted. As a result, single bit errors can be detected. However, since there is no way to detect which particular bit is in error, correction is not possible. Furthermore, if two or any even number of bits are in error, the parity will be correct and no error will be detected. Parity therefore is capable of detecting only odd numbers of errors and is not capable of correcting any bits determined to be in error.

Error correction codes (ECCs) have thus been developed to not only detect but also correct bits determined to be in error. ECCs utilize multiple parity check bits stored with the data message in memory. Each check bit is a parity bit for a group of bits in the data message. When the message is read from memory, the parity of each group, including the check bit, is evaluated. If the parity is correct for all of the groups, it signifies that no detectable error has occurred. If one or more of the newly generated parity values are incorrect, a unique pattern called syndrome results, which may be used to identify the bit in error. Upon detection of the particular bit in error, the error may be corrected by complementing the erroneous bit.

A widely used type of ECC utilized in error control in digital systems is based on the codes devised by R. W. Hamming, and thus take the name "Hamming codes". One particular subclass of Hamming codes includes the single error correcting and double error detecting (SEC-DED) codes. As their name suggests, these codes may be utilized not only to correct any single bit error but also to detect double bit errors.

Another type of well-known ECC is the single symbol correction and double symbol detection (SSC-DSD) codes, which are used to correct single symbol errors and detect double symbol errors. In systems implementing these types of codes, the symbol represents a multiple bit package or chip. Hence, as the name implies, an SSC-DSD code in a system utilizing n bit symbols would be capable of correcting n bits in a single symbol and detecting errors occurring in double symbols.

As memory systems become larger, conventional single symbol error correct, double symbol error detect strategies, are no longer adequate. New strategies are required to deal with entire memory chip failures. Typically, several chips are used to hold user data with one or more additional chips used for check information and other required system data. If each cache line had two redundant chips, which could be used entirely for correction, then, for example, a conventional Reed-Solomon error correction strategy could be used. However frequently the system requires that a portion of the extra chips are allocated for system specific information, and the ECC has less than 2 full chips available for holding check information. Examples of such information are those that would reduce the power of the memory system, or improve the reliability of the memory system.

SUMMARY OF THE INVENTION

An object of this invention is to provide a strategy for detecting memory errors in computer systems.

Another object of the present invention is to provide a method and system for detecting and correcting memory chip errors when less than two full redundant memory chips can be used for error correcting code.

Another object of the invention is to provide a memory error correcting approach that, with high probability, can correct memory chip failure with a much-reduced amount of redundancy.

These and other objectives are attained with a method and system for detecting memory chip failure in a computer memory system. The memory system includes a first set of user data memory chips and a second set of system data memory chips. The method for detecting chip failure comprises the steps of accessing user data from the user data chips; and using error detection data from the system data chips testing the user data for errors. This testing step includes the steps of (i) generating a sequence of check symbols from the user data, (ii) grouping the user data into a sequence of data symbols, (iii) computing a sequence of syndromes using said sequence of data symbols and said sequence of check symbols, (iv) if all the syndromes are zero, identifying the user data as having no error, and (v) if one of the syndromes is non-zero, then (1) computing a set of discriminator expressions, and (2) using said discriminator expressions to determine whether a single symbol error has occurred or a double symbol error has occurred. In the preferred embodiment, if an error is detected, then the error is corrected, and less than two full system data chips are used for testing the user data and correcting the error.

Also, in the preferred embodiment of the invention, the step of computing the set of discriminator expressions includes the step of computing a set of discriminator expressions $D0$, $D1$ and $D$ using the syndromes. More specifically, the sequence of syndromes includes first and second syndromes $S0$ and $S1$ respectively; and the step of using the discriminator expressions to determine whether a single symbol error or a double symbol error has occurred includes the step of testing to determine whether (i) $D0=D1=D2=0$, and (ii) both $S0$ and $S1$ are non-zero. If $D0=D1=D2=0$ and both $S0$ and $S1$ are non-zero, then a single symbol error has occurred, and the method comprises the further step of using $S1$ and $S0$ to identify the location and then correct the error. If each of $D0$, $D1$ and $D2$ is non-zero, then the method comprises the further step of computing a second set of discriminator expressions $E2$, $E3$ and $E4$. If $E2=E3=E4=0$ then a double syndrome error has occurred, and the method comprises the further step of using $D0$, $D1$ and $D$ to identify the locations of the errors and compute the correct error values.

In addition, in one embodiment of the method of this invention, the syndromes may be used to determine if an entire one of the memory chips has failed. In this embodiment, the method comprises the further steps of identifying the number, $N1$, of syndromes in the sequence of syndromes; identifying the number, $N2$, of the data symbols in error when an entire one of the memory chips has failed; and determining a third number $N3$ by the equation: $N1-N2=N3$. $N3$ of the syndromes are modified to produce $N3$ modified syndromes, and these $N3$ modified syndromes are used to determine if an entire one of the memory chips has failed. In this embodiment, the $N3$ modified syndromes may also be used to identify the locations of said entire one of the memory chips that has failed and then compute the corrected contents of the memory chip. Once the location of the failed chip is known, then the $N3$ modified syndromes can be used to locate and correct an additional symbol error.

The basic approach of the preferred embodiment of the invention is to treat each potentially failing chip as a burst of errors and compute sets of modified syndromes for each possible chip location. If only one set of modified syndromes is zero, then we have located the failing chip. Since we want to minimize the performance impact on the memory system, preferably the ECC uses as much parallelism as possible to minimize latency.

Further benefits and advantages of the present invention will become apparent from a consideration of the following detailed description, given with reference to the accompanying drawings, which specify and show preferred embodiments of the invention.

BRIEF DESCRIPTION OF THE PREFERRED EMBODIMENTS

DETAILED DESCRIPTION OF THE PREFERRED EMBODIMENTS

Figure 1:
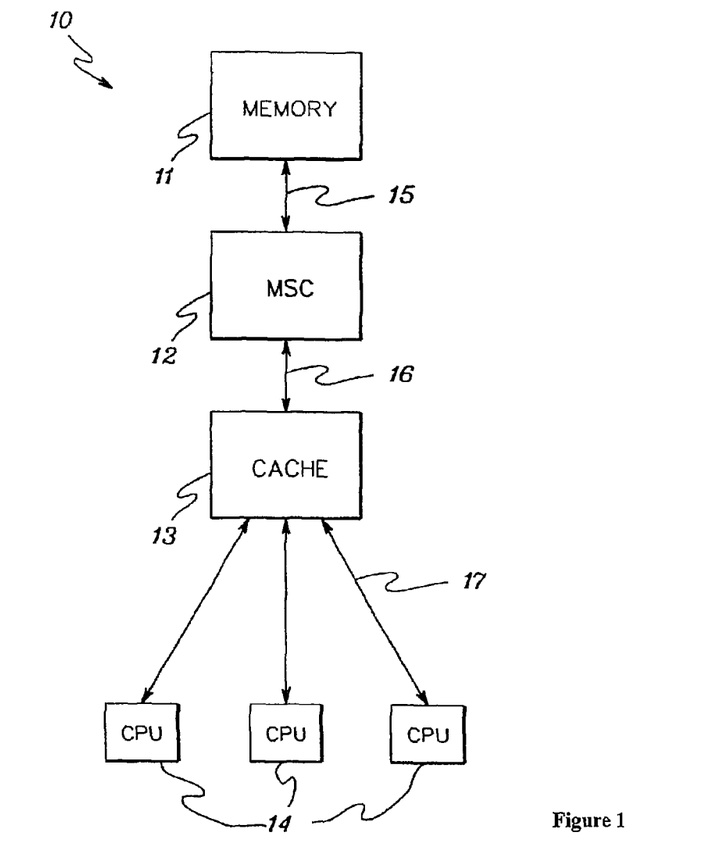
FIG. 1 depicts one example of a computer system that practices error detection and correction in accordance with the present invention.

FIG. 1 shows a block diagram representation of a computer system 10 utilizing the error correction code of the present invention. In this embodiment, computer system 10 includes a memory 11 connected to a main storage controller (MSC) 12 via a data bus 15, a cache 13 connected to MSC 12 via a data bus 16, and a plurality of central processing units (CPUs) 14 connected to cache 13 via data buses 17. Data buses 16 and 17 may typically be 72 bits wide. Communication of data between memory 11 and MSC 12, in comparison, occurs via data bus 15. Thus, data bus 15 facilitates the transmission of data read from memory 11 by MSC 12 as well as data written to memory 11 by MSC 12.

Data bus 15, in one embodiment, is 160 bits wide but nevertheless may vary in width according to the requirements of the particular system while still receiving error protection under the ECC of the present invention. In this regard, the ECC of the present invention is specifically designed to meet the data requirements of a wide variety of servers including data buses having widths of, for example, 140, 142, 143, 144, 152, and 162 bits.

The data transmitted in computer system 10 is arranged into a data word having a size dependent on the particular data bus utilized by the system. Furthermore, the data word may be arranged into variably sized symbols. For instance, in one example, the data word comprises a plurality of six bit symbols.

Figure 2:
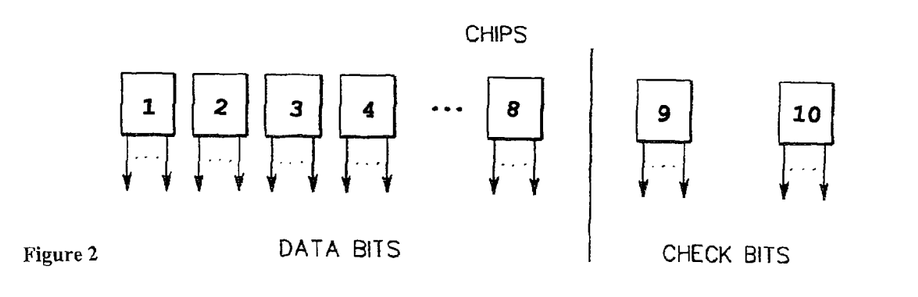
FIG. 2 illustrates one example of a memory arrangement that may be used in this invention.

With reference to FIG. 2, a representative system of the present invention uses ten memory chips, which are 16 bits wide. Eight chips are used to hold user data, and the remaining two contain ECC check information along with system data. Each single memory access returns 160 bits of data, which we will call a line of data. The preferred error correcting code of this invention is defined over two sequential memory accesses to all the chips (two lines), so from the eights user data chips in total there are 8*16*2=256 bits of user data. The two extra chips can hold 2*16*2=64 bits, and one embodiment of the invention allocates 54 bits for ECC check information and leaves ten bits for system information. Each line of data is decomposed into groups of three bits, and we form six-bit symbols from the corresponding three bit groups for the two lines. Another natural organization would involve eight bit symbols composed of four bits from each line. Our approach uses a Reed-Solomon code, which, in the case of six-bit symbols, would mean that we interpret the symbols as being members of the finite field with 64 elements. If we used eight-bit symbols, then we would be working over the finite field with 256 elements. Each such finite field contains a specific primitive element, referred to herein as $\alpha$, which has the property that each non-zero element of the finite field can be expressed as a power of $\alpha$.

In our specific embodiment, we assume that the data to be protected in each line includes 128 bits of user data, two inversion bits (described below) and two address parity bits, which are not stored in the chips, but instead are computed from the memory address. Thus, there are 132 bits of data to be encoded per line for a total of 2*132=264 bits=44 six bit symbols. Assuming we use nine check symbols, we have a total codeword length of 44+9=53 symbols. Note that since our chips are 16 bits on each line, a chip failure produces six symbol errors. Using conventional error correction, we would need twelve check symbols to correct six symbol errors. The preferred embodiment of this invention can, with high probability, correct chip failures with a much-reduced amount of redundancy.

Check Symbols/Syndromes

We will first describe the encoding process which, given user data, will compute the nine check symbols. We will denote the 44 data symbols as $d_0, \ldots, d_{43}$ and the nine check symbols as $c_0, \ldots, c_8$. We then make the generator polynomial $$g(x) = \prod_{i=0}^{8} (x + a^i).$$

We compute values for $c_0, \ldots, c_8$ such that $c_0+c_1 x+ \ldots +c_8 x^8$ is the remainder of dividing $x^9(d_0+d_1 x+ \ldots +d_{43}x^{43})$ by $g(x)$. This computation can be done by multiplying a fixed 9 by 44 matrix by the vector of 44 data symbols, whose columns correspond to the remainder by $g(x)$ of the successive powers of x, from $x^9$ through $x^{52}$. We assume that the representation of our finite field is such that there exists an element u such that any six bit symbol can be split into two three bit fields, and multiplication by u maps the low order three bits to the high order three bits. In this case, we can operate separately on each line of user data, allowing us to cut the size of the encoder matrix in half. The final check symbols are computed by successively applying the half encoder matrix to each line of data, and adding the first application to u times the second application.

In the preferred implementation of the present invention, check bits are generated as data are transmitted from MSC 12 to memory 11. Upon generation, the check bits are stored, together with the transmitted data, in memory 11. As mentioned above, in the embodiment depicted in FIG. 2, nine check symbols are generated and stored on chips 9 and 10.

To begin the decoding, we will first need to compute the nine syndromes. The received data $r_0, \ldots, r_{52}$, where $r_0$ through $r_8$ correspond to the check symbols and $r_9$ through $r_{52}$ correspond to user data, is viewed as a polynomial $$R(x) = \sum_{i=0}^{52} r_i x^i.$$

The syndromes $S_0, S_1, \ldots, S_8$ are computed as $S_j = R(\alpha^j)$. This syndrome generation can also be done using a fixed 9 by 53 matrix. But since the lines of data arrive sequentially, we can also split this matrix into two and compute the contribution to the syndromes from the first line of data and combine the result from the second line of data times u.

If all the syndromes are zero, then the decoder presumes no error has occurred. Otherwise, in parallel, we check for various error patterns. One embodiment of this invention corrects a single symbol error, a double symbol error, or an entire chip failure (chip kill).

Single/Double Error Correct

Figure 3:
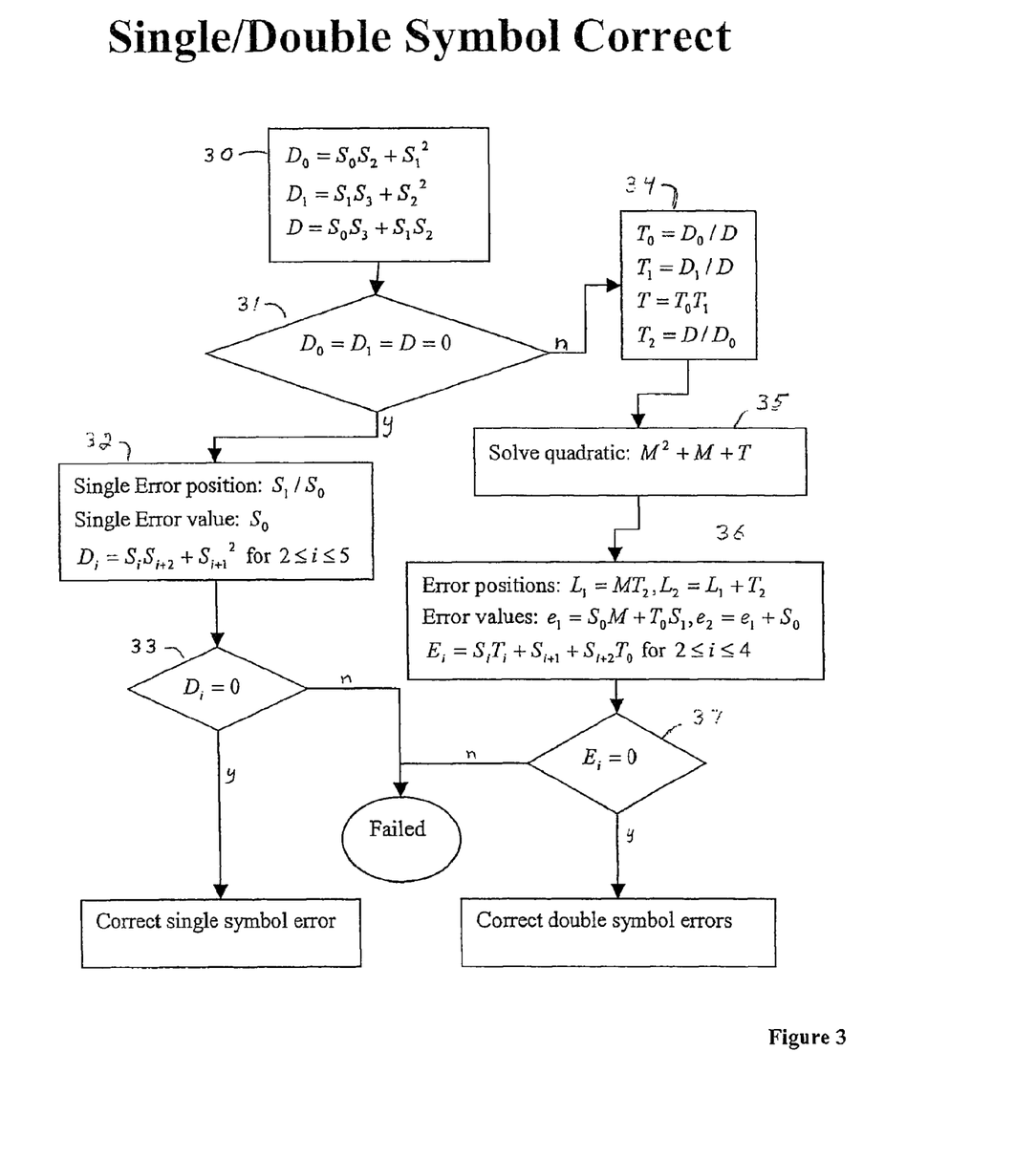
FIG. 3 shows a single/double symbol correct procedure embodying the present invention.

The procedures for correcting single and double errors are illustrated in FIG. 3. Using the syndromes we can, at step 30, compute some discriminator expressions to decide whether or not a single or double error occurred. So we proceed to compute: $D_0 = S_0 S_2 + S_1^2$, $D_1 = S_1 S_3 + S_2^2$, $D = S_0 S_3 + S_1 S_2$. At step 31, we determine if $D_0=D_1=D=0$. If a single error occurred, then we must have that $D_0=D_1=D=0$, both $S_0$ and $S_1$ are nonzero, and then the syndrome $S_0$ contains the value of the error, i.e. the correction to add back to the received data. The location of the error is computed at step 32 by dividing $S_1/S_0$ and comparing this result against $a^i$ for i from 0 . . . 52. The division can be computed in parallel with the computation of the $D_i$ so the result will be ready in case the single error test succeeds. The value of i for which they are equal gives the position of the error. To verify that only one error occurred, we also compute the following $D_i=S_iS_{i+2}+S_{i+1}^2$ for i=2,3,4 and 5. They all must be zero if only one symbol error occurred, as represented at step 33.

If a double error occurred, then we must have that each of $D_0$, $D_1$ and D must be non-zero, and the error positions are determined by the two roots of the polynomial $P(L)=D_0L^2+DL+D_1$. To find these solutions, at step 34, we compute $T_0=D_0/D$, $T_1=D_1/D$, $T=T_0T_1$, $T_2=D/D_0$. We now, at step 35, solve a "normalized" quadratic of the form $M^2+M+T$, which can be directly solved with a small circuit, which produces one solution M (the other solution is M+1). The solutions to the original quadratic are now $L_1=MT_2$ and $L_2=L_1+T_2$. Each of $L_1$ and $L_2$ can be represented as a power of $\alpha$, and, as represented at step 36, the exponent determines the position of the error as in the single error case. The associated error values are computed as: $e_1=S_0M+T_0S_1$ and $e_2=e_1+S^0$. Simultaneously we verify that two errors did actually occur by computing $E_i=S_iT_1+S_{i+1}+S_{i+2}T_0$ for i=2, 3, and 4. For two errors to have occurred, all of the $E_i$ must be equal to zero, as represented at step 37.

Chip Kill

The other class of errors which we want to handle involve memory chip failures (chip kill). In this particular embodiment of the invention, each memory chip delivers 16 bits of data per access. As our symbols have 3 bits from each of the two memory accesses, a 16-bit chip failure per line can produce six contiguous symbol errors. Our circuit operates in two modes. Before we have identified a known chip failure, we search for what we call a "soft chip kill". This indicates a potential chip failure whose position is not yet known to us. Once the same chip has failed several times, it becomes a "hard chip kill", which indicates that from then on we remember the location of the failing chip. After we have a hard chip kill, this invention will, in addition, allow the correction of a single symbol error event.

Figure 4:
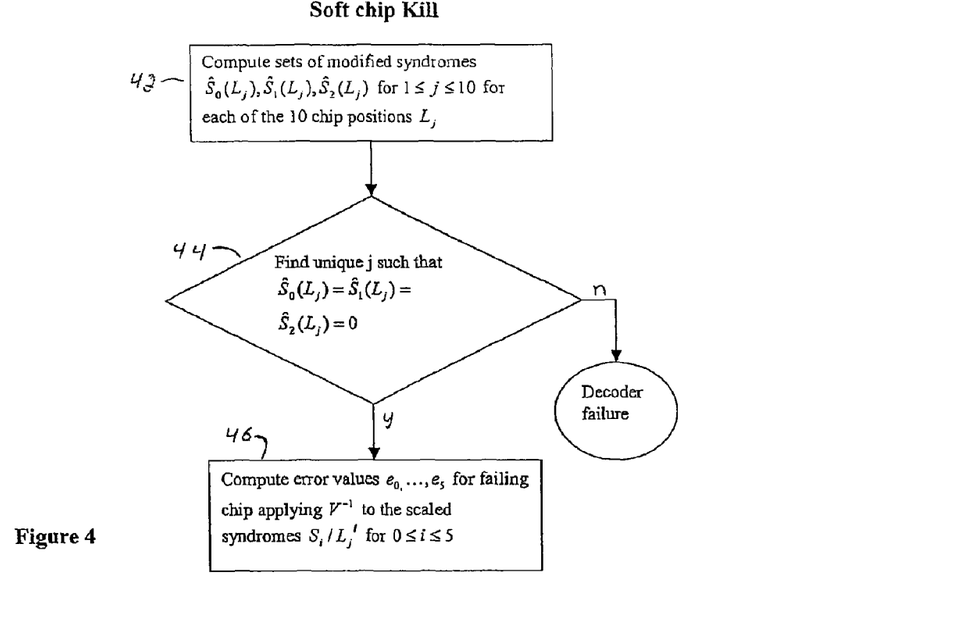
FIG. 4 illustrates a procedure for detecting a soft chip kill.

FIG. 4 illustrates a preferred strategy for identifying and locating a chip failure whose position is not yet known. Since the representative embodiment of our algorithm uses 10 memory chips, there are 10 positions where we could have a chip failure, which appears in the code as a contiguous block of six symbols all of which could be in error. If we knew which chip was failing, then we would treat this as an erasure event, and we would have enough check symbols to correct it. Typically to correct erasures, one, at step 42, modifies the syndromes to take into account the erasure pattern. If there are no additional errors, the modified syndromes will all be zero. If there are additional errors, one uses the modified syndromes, at step 44, to locate the additional errors. The number of modified syndromes one can compute is the number of original syndromes, reduced by the total number of erasures. In our case, we begin with 9 syndromes and are considering six symbol erasure patterns, so we will have 9−6=3 modified syndromes. We have ten potential positions for the erasure patterns, so we will have ten sets (each of size three) of modified syndromes. If exactly one set of modified syndromes are all zero, then we will designate the corresponding chip as the failing one.

More specifically, for any of the ten chip positions, let the symbol L represent $\alpha$ raised to the exponent equal to the starting position of the chip, i.e. the first six bit symbol which has some bits in common with this chip. Now, form the polynomial $$P_L(x) = \prod_{k=0}^{5}(x + L\alpha^k) = \sum_{i=0}^{6} p_i(L)x^i.$$

Relative to L, we can, at step 42, now form the three modified syndromes.

$$\hat{S}_j = \sum_{i=0}^{6} p_i(L)S_{i+j}$$

for j=0,1,2. Note that $\hat{S}_j$ is the inner product of the coefficients of P with seven syndromes starting in position j. So we can produce a modified syndrome matrix whose ten rows give the coefficients of P at all ten chip positions. If we multiply this matrix times the vector $[S_0, S_1, S_2, S_3, S_4, S_5, S_6]$ then we produce the ten modified syndromes $\hat{S}_0$ for all ten-chip positions. Using a copy of the same matrix, but applying it to the vector from $S_1$ to $S_7$, we would produce the ten values of $\hat{S}_0$ and finally if we again apply that matrix to the syndromes from $S_2$ to $S_8$, we produce the family of ten values for $\hat{S}_2$. To locate the failing chip, at step 44, we want a value of L such that the corresponding three modified syndromes $\hat{S}_0$, $\hat{S}_1$, $\hat{S}_2$ are all zero. If there is exactly one value of L with this property, then we have located the failing chip. The remaining task is to compute the six error values associated with the failing chip. This is done at step 46.

We begin by creating the inverse of the Vandermonde matrix V associated with the values $1, \alpha, \alpha^2, \ldots, \alpha^5$. V is a six by six matrix such that $V_{i,j}=\alpha^{ij}$ for i,j=0, . . . ,5. Since V does not depend on L, its inverse $V^{-1}$ is a constant matrix. The error values for the chip at location L are determined by $[e_0, e_1, \ldots, e_5]=V^{-1}[S_0, S_1/L, S_2/L^2, S_3/L^3, S_4/L^4, S_5/L^5]$, so we multiply the inverse Vandermonde times the first six scaled syndromes, where the ith syndrome is scaled by $1/L^i$. Note that we need to multiply by 5 scaling factors for each of the ten chip positions, so we can precompute these values and store them in a table. This completes the decoding in the case of "soft chip kill".

Figure 5:
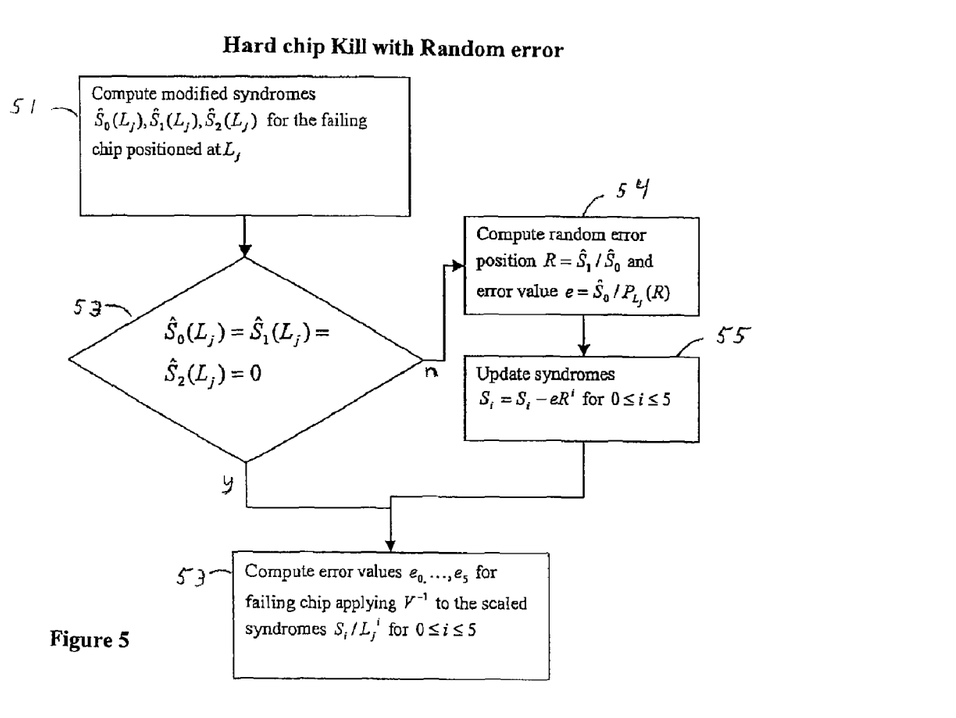
FIG. 5 depicts a procedure for detecting a hard chip kill.

After the same chip has failed several times, it becomes convenient to treat it as a permanently failed chip, which we call a "hard chip kill". FIG. 5 shows a preferred method for computing the error values for a permanently failed chip. In this situation, at step 51, we still compute the modified syndromes, but instead of using them to test which chip failed, we simply extract, at step 52, the three modified syndromes associated to the failed chip. If all three of them are zero, then we assume no additional error occurred and we can, at step 53, use the same approach as in the soft chip kill case to compute the error values. If some of the modified syndromes are zero and some are nonzero, then an uncorrectable error has occurred. Assuming all three of the modified syndromes are nonzero, we attempt to perform an additional symbol correct. As represented at step 54, if there is only one additional error, its location will be $R=\hat{S}_1/\hat{S}_0$. At the same time, we verify one additional error by checking that $\hat{S}_0\hat{S}_2=\hat{S}_1^2$ or else the error is uncorrectable.

Now we need to compute $R^2, R^3, R^4, R^5, R^6$. The circuit to compute these powers can take advantage of the fact that squaring is a very cheap operation defined by a constant matrix. We can reuse one of the matrices we used for the modified syndrome applying it to the vector $[1, R, R^2, R^3, R^4, R^5, R^6]$. The result will be 10 values of $P_L(R)$ and we extract the value corresponding to the value of L for the failed chip, i.e., take the ith value if chip i failed. Now the error value associated with position R is given by $e=R=\hat{S}_0/P_L(R)$. We then, at step 55, update the first five syndromes to remove the effect of the additional symbol error. $S_j=S_j-eR^j$ for $j=0,1,2,3,4,5$. We use these updated syndromes to correct the error value for the failed chip just as in the soft chip kill situation.

Invert Bits and Spare Bits

The ECC code above allows for 10 bits of system data in two transfers of data. These can be used to strengthen the memory system reliability, to reduce the power of the memory system, or any other such advantageous use. We chose to use the 10 bits (5 bits per transfer) as follows:
1) Invert bit for lower 8B of data transfer.
2) Invert bit for upper 8B of data transfer.
3) Two spare bits for redundant bit steering.
4) One address parity bit.

The invert bit is easily described. This technique is well known in the literature, however, we know of no instance where it has been included into an ECC field and thus protected. The bit is 0 if on the next transition of the bus, less than ½ the bits will change state. Otherwise, invert all bits including the "invert bit". This bit is then checked when data is received. If set, invert all bits. This is the simplest version of a class of codes known as "constrained switching" codes.

Here is a prescription for setting the invert bit. The data is being moved between an L3 cache built of EDRAM, which for purposes of this invention is similar to DRAM.

1) Receive data from L3 cache (32-byte bus).
2) Compare L3 data in 16 byte units. For example, compare the 2nd 16-byte transfer of data to the 1st 16-byte transfer of data. If more than 8 bytes switch, set inversion indicator for 2nd 16-byte chunk and store with data, use newly inverted data for the 2nd chunk to compare to 3rd 16-byte chunk. In our implementation, there is 1 invert bit per 8 bytes of data transferred.
3) When data is stored, generate ECC with inverted data and include inversion indicator in ECC matrix.
4) When data is fetched, verify data (i.e. ECC check) using the inverted data and the inversion indicator. Invert the data on its way back to the L3.

Figure 6:
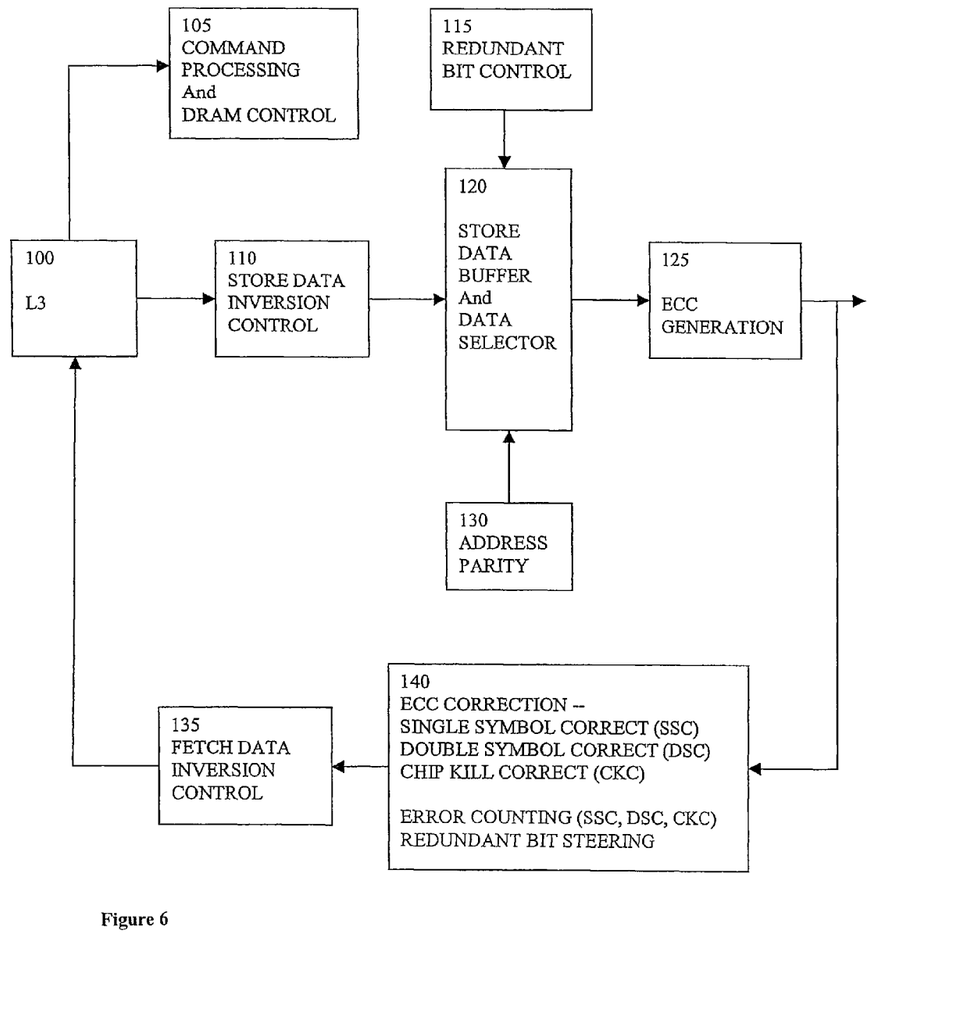
FIG. 6 illustrates data store and fetch operations, in which the data include an inverted bit.

This flow is illustrated in FIG. 6 for a cache line, which must be stored in external DRAM memory.

Here data stored in cache memory 100 is sent to logical unit 110, which analyzes each 8 Byte increment of data to be stored, by comparing it to the previous transfer. In parallel information is sent to external memory controller 105 informing it of an impending transfer so the external DRAM can be readied for write data. When 110 has completed its analysis for the first transfer of data and computed the invert bit value (and inverted all bits if necessary), the data is passed to store data buffer 120. In parallel, if bad bits were identified logical unit 115 replaces those bits with others by setting mux controls as is common practice. Also, address bus parity is computed by logic unit 130 and added to the store data buffer. When signal is received by 120 to move data out of the buffer, it is sent to ECC generation unit 125 and then written to memory. Here data statistics are kept to look for memory locations, which may need to be marked as bad, or replaced with redundant bits. If this had been a read from external memory, then data would have gone into logic unit 140 for possible ECC correction, and then passed to unit 135 for data inversion if the invert bits had been set, and finally stored in cache memory 100.

As will be readily apparent to those skilled in the art, the present invention or aspects of the invention can be realized in hardware, software, or a combination of hardware and software. Any kind of computer/server system(s)- or other apparatus adapted for carrying out the methods described herein— is suited. A typical combination of hardware and software could be a general-purpose computer system with a computer program that, when loaded and executed, carries out methods described herein. Alternatively, a specific use computer, containing specialized hardware for carrying out one or more of the functional tasks of the invention, could be utilized.

The present invention or aspects of the invention can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of detecting memory chip failure in a computer memory system, the memory system including a first set of user data memory chips and a second set of system data memory chips, the method comprising the steps of:
    accessing user data from the user data chips,
    testing the user data for errors using error detection data from the system data chips, including the steps of
    i) generating a sequence of check symbols from the user data,
    ii) grouping the user data into a sequence of data symbols,
    iii) computing a sequence of syndromes using said sequence of data symbols and said sequence of check symbols,
    iv) if all the syndromes are zero, identifying the user data as having no error, and
    v) if one of the syndromes is non-zero, then (1) computing a set of discriminator expressions, and (2) using said discriminator expressions to determine whether a single symbol error has occurred or a double symbol error has occurred.

2. A method according to claim 1, comprising the further step of using said syndromes to determine if an entire one of the memory chips has failed.

3. A method according to claim 1, comprising the further step of:
    if an error is detected, then correcting said error; and
    wherein less than two full system data chips are used for testing the user data and correcting the error.

4. A method according to claim 3, comprising the further step of using extra bits on said two full system data chips for constraining the number of switching data bits in the memory system.

5. A method according to claim 1, wherein the step of using said syndromes to determine if an entire one of the memory chips has failed includes the steps of:
  identifying the number, N1, of syndromes in the sequence of syndromes;
  identifying the number, N2, of the data symbols in error when an entire one of the memory chips has failed;
  determining a third number N3 by the equation: N1−N2=N3;
  modifying N3 of the syndromes to produce N3modified syndromes; and
  using said N3 modified syndromes to determine if an entire one of the memory chips has failed.

6. A method according to claim 5, wherein the step of using said syndromes includes the further step of using said N3 modified syndromes to identify the locations of said entire one of the memory chips that has failed.

7. A method according to claim 5, wherein the step of using said N3 modified syndromes includes the step of determining if all of said N3 modified syndromes are equal to zero.

8. A method according to claim 1, wherein:
  the step of computing the set of discriminator expressions includes the step of computing a set of discriminator expressions D0, D1 and D using the syndromes.

9. A method according to claim 8, wherein:
  the sequence of syndromes includes first and second syndromes S0 and S1 respectively; and
  the step of using the discriminator expressions to determine whether a single symbol error or a double symbol error has occurred includes the step of testing to determine whether:
    i) D0=D1=D2=0, and
    ii) both S0 and S1 are non-zero.

10. A method according to claim 9, wherein:
  if D0=D1=D2=0 and both S0 and S1 are non-zero, then a single symbol error has occurred.

11. A method according to claim 10, comprising the further step of using S1 and S0 to identify the location of the error.

12. A method according to claim 9, wherein if each of D0, D1 and D2 is non-zero, then a double syndrome error has occurred.

13. A method according to claim 12, wherein:
  the step of computing the set of discriminator expressions includes the step of computing another set of discriminator expressions $E_j$ using the syndromes; and
  the step of using the set of discriminator expressions includes the further step of using the discriminator expressions $E_j$ to confirm that a double syndrome error has occurred.

14. A method according to claim 12, comprising the further step of using D0, D1 and D to identify the locations of the errors.

15. A method according to claim 14, comprising the further step of using D0, D1 and D to correct the double errors.

16. A memory error detection system for detecting memory chip failure in a computer memory system, the memory system including a first set of user data memory chips and a second set of system data memory chips, the memory error detection system comprising:
  a memory controller for accessing user data from the user data chips and for testing the user data for errors using error detection data from the system data chips by:
    i) generating a sequence of check symbols from the user data,
    ii) grouping the user data into a sequence of data symbols,
    iii) computing a sequence of syndromes using said sequence of data symbols and said sequence of check symbols,
    iv) if all the syndromes are zero, identifying the user data as having no error, and
    v) if one of the syndromes is non-zero, then (1) computing a set of discriminator expressions, and (2) using said discriminator expressions to determine whether a single symbol error has occurred or a double symbol error has occurred.

17. A memory error detection system according to claim 16, the memory controller includes code for correcting an error in the user data, and wherein less than two full system data chips are used for testing the user data and correcting the error.

18. A memory error detection system according to claim 17, wherein extra bits on said two full system data chips are used for constraining the number of switching data bits in the memory system.

19. A memory error detection system according to claim 16, wherein:
  the set of discriminator expressions are computed by computing a set of discriminator expressions D0, D1 and D using the syndromes;
  the sequence of syndromes includes first and second syndromes S0 and S1 respectively; and
  the discriminator expressions are used to determine whether a single symbol error or a double symbol error has occurred by testing to determine whether:
    i) D0=D1=D=0, and
    ii) both S0 and S1 are non-zero;
  if D0=D1=D=0 and both S0 and S1 are non-zero, then a single symbol error has occurred, and S1 and S0 are used to identify the location of the error; and
  if each of D0, D1 and D is non-zero, then a double syndrome error has occurred, and D0, D1 and D are used to identify the locations of the errors.

20. A memory error detection system according to claim 19, wherein said D0, D1 and D are used to correct the double errors.

21. A memory error detection system according to claim 19, wherein another set of discriminator expressions $E_j$ are computed using the syndromes, and said another set of discriminator expressions $E_j$ are used to confirm that a double syndrome error has occurred.

22. A program storage device tangibly embodying a program of instructions readable by machine for instructing the machine to perform method steps for detecting memory chip failure in a computer memory system, the memory system including a first set of user data memory chips and a second set of system data memory chips, said method steps comprising:
  accessing user data from the user data chips, testing the user data for errors using error detection data from the system data chips, including the steps of:
    i) generating a sequence of check symbols from the user data,
    ii) grouping the user data into a sequence of data symbols,
    iii) computing a sequence of syndromes using said sequence of data symbols and said sequence of check symbols,
    iv) if all the syndromes are zero, identifying the user data as having no error, and
    v) if one of the syndromes is non-zero, then (1) computing a set of discriminator expressions, and (2) using said discriminator expressions to determine whether a single symbol error has occurred or a double symbol error has occurred.

23. A program storage device according to claim 22, wherein said method steps comprise the further step of:
if an error is detected, then correcting said error; and
wherein less than two full system data chips are used for testing the user data and correcting the error.

24. A program storage device according to claim 22, wherein:
the step of computing the set of discriminator expressions includes the step of computing a set of discriminator expressions D0, D1 and D using the syndromes;
the sequence of syndromes includes first and second syndromes S0 and S1 respectively, and the step of using the discriminator expressions to determine whether a single symbol error or a double symbol error has occurred includes the step of testing to determine whether:
i) D0=D1=D2=0, and
ii) both S0 and S1 are non-zero;
if D0=D1=D2=0 and both S0 and S1 are non-zero, then a single symbol error has occurred, and said method steps comprise the further step of using S1 and S0 to identify the location of the error; and
if each of D0, D1and D2is non-zero, then a double syndrome error has occurred, and said method steps comprise the further step of using D0, D1 and D to identify the locations of the errors.

25. A method of detecting failure of an entire memory chip in a computer memory system, the memory system including a first set of user data memory chips and a second set of system data memory chips, the method comprising the steps of:
accessing user data from the user data chips;
testing the user data for errors using error detection data from the system data chips, including the steps of:
i) generating a sequence of check symbols from the user data,
ii) grouping the user data into a sequence of data symbols,
iii) computing a sequence of syndromes using said sequence of data symbols and said sequence of check symbols, and
iv) using said syndromes to determine whether an entire one of the data memory chips has entirely failed, and if so, to identify which one of said data memory chips has entirely failed, including computing a respective one set of modified syndromes for each of the user data memory chips, and using the sets of modified syndromes to determine the one of the data memory chips that has entirely failed.

26. A method according to claim 25, comprising the further step of, after using the modified syndromes to locate a failing chip, then using the original syndromes to correct the content of the failing chip.

27. A method according to claim 25, comprising the further steps of:
once the same memory chip has failed repeatedly, declaring said failed memory chip a hard chip kill whose location is known; and
then locating and correcting one additional symbol error besides correcting the contents of the known failed chip.

28. A method of detecting failure of an entire memory chip in a computer memory system, the memory system including a first set of user data memory chips and a second set of system data memory chips, the method comprising the steps of:
accessing user data from the user data chips;
testing the user data for errors using error detection data from the system data chips, including the steps of:
i) generating a sequence of check symbols from the user data,
ii) grouping the user data into a sequence of data symbols,
iii) computing a sequence of syndromes using said sequence of data symbols and said sequence of check symbols, and
iv) using said syndromes to determine whether an entire one of the data memory chips has entirely failed, and if so, to identify which one of said data memory chips has entirely failed; and
wherein the step of using said syndromes to determine if an entire one of the memory chips has failed includes the steps of:
identifying the number, N1, of syndromes in the sequence of syndromes;
identifying the number, N2, of the data symbols in error when an entire one of the memory chips has failed;
determining a third number N3 by the equation: N1−N2=N3;
modifying N3 of the syndromes to produce N3 modified syndromes; and
using said N3 modified syndromes to determine if an entire one of the memory chips has failed.

29. A method according to claim 28, wherein the step of using said syndromes includes the further step of using said N3 modified syndromes to identify the locations of said entire one of the memory chips that has failed, including the step of determining if all of said N3 modified syndromes are equal to zero.

30. A memory error detection system for detecting failure of an entire memory chip in a computer memory system, the memory system including a first set of user data memory chips and a second set of system data memory chips, the memory error detection system comprising:
a memory controller for accessing user data from the user data chips and for testing the user data for errors using error detection data from the system data chips by:
i) generating a sequence of check symbols from the user data,
ii) grouping the user data into a sequence of data symbols,
iii) computing a sequence of syndromes using said sequence of data symbols and said sequence of check symbols, and
iv) using said syndromes to determine whether an entire one of the data memory chips has failed, and if so, to identify which one of said data memory chips has failed, including computing a respective one set of modified syndromes for each of the user data memory chips, and using the sets of modified syndromes to determine the one of the data memory chips that has entirely failed.

31. A memory error detection system according to claim 30, wherein less than two full system data chips are used for testing the user data and correcting the failed memory chip.

32. A memory error detection system according to claim 31, wherein extra bits on said two full system data chips are used for constraining the number of switching data bits in the memory system.

33. A memory error detection system according to claim 30, wherein said syndromes are used to determine if an entire one of the memory chips has failed by:
identifying the number, N1, of syndromes in the sequence of syndromes;

identifying the number, N2, of the data symbols in error when an entire one of the memory chips has failed;

determining a third number N3 by the equation: N1−N2=N3;

modifying N3 of the syndromes to produce N3 modified syndromes; and using said N3 modified syndromes to determine if an entire one of the memory chips has failed.

34. A memory error detection system according to claim 33, wherein said N3 modified syndromes are used to identify the locations of said entire one of the memory chips that has failed.

35. A memory error detection system according to claim 33, wherein said N3 modified syndromes are used to identify the location of said entire one of the memory chips that has failed by determining if all of said N3 modified syndromes are equal to zero.

* * * * *